United States Patent [19]
Birchmeier

[11] Patent Number: 5,662,542
[45] Date of Patent: Sep. 2, 1997

[54] ACTUATING DRIVE HAVING A SPRING RETURN FEATURE

[75] Inventor: Werner Birchmeier, Schweiz, Germany

[73] Assignee: Johnson Service Company, Milwaukee, Wis.

[21] Appl. No.: 509,772

[22] Filed: Aug. 1, 1995

[30] Foreign Application Priority Data

Aug. 17, 1994 [EP] European Pat. Off. .............. 94112825

[51] Int. Cl.$^6$ .................................................. F16K 31/02
[52] U.S. Cl. ........................... 475/154; 475/157; 74/575; 74/577 R
[58] Field of Search .............................. 475/149, 154, 475/156, 157; 192/12 BA, 41 S; 74/575, 577 R, 577 S, 577 M, 578

[56] References Cited

U.S. PATENT DOCUMENTS

| | | | |
|---|---|---|---|
| 2,659,249 | 11/1953 | Carr | 475/157 |
| 2,984,126 | 5/1961 | Feaster | 475/157 |
| 3,465,605 | 9/1969 | Hylan | 74/575 |
| 3,921,264 | 11/1975 | Madonian et al. | 475/154 |
| 3,987,880 | 10/1976 | Holland-Letz et al. | 192/12 BA |
| 4,585,115 | 4/1986 | Lindblom et al. | 475/154 |
| 4,651,580 | 3/1987 | Deane | 475/154 |
| 4,760,903 | 8/1988 | Stegelmeier et al. | 192/12 BA |
| 4,951,021 | 8/1990 | Theisen et al. | |
| 5,269,195 | 12/1993 | Kitagawara | 74/577 M X |
| 5,365,804 | 11/1994 | Downs et al. | 74/575 X |
| 5,454,765 | 10/1995 | Sommer | 475/154 |
| 5,518,462 | 5/1996 | Yach | 475/149 |

FOREIGN PATENT DOCUMENTS

| | | |
|---|---|---|
| 0 093 289 | 11/1983 | European Pat. Off. . |
| 0 330 804 | 9/1989 | European Pat. Off. . |
| 84/03370 | 8/1984 | WIPO . |

*Primary Examiner*—Charles A. Marmor
*Assistant Examiner*—Peter T. Kwon
*Attorney, Agent, or Firm*—Harness, Dickey & Pierce, P.L.C.

[57] ABSTRACT

An actuating drive with a spring return feature for valves in heating, ventilation and air-conditioning systems includes an electric drive (1), a reduction gearing (2) having a return spring tensionable by the actuating movement and serving for the spring return movement, a clutch (3) between the electric drive (1) and the reduction gearing (2) and a brake device (4) actuated during the spring return movement. The brake device (4) takes the form of a centrifugal brake having a fixed brake drum (7) and a rotatably mounted brake shoe carrier (6) on which brake shoes (8) movable radially by centrifugal force are disposed. The brake shoe carrier (6) serves as the clutch member on the gearing side and has a journal (9) having an end pinion (10) engaging in the reduction gearing. The clutch member (5, 11) on the drive side is rotatably mounted on the journal (9) of the brake shoe carrier (6).

9 Claims, 3 Drawing Sheets

5,662,542

ACTUATING DRIVE HAVING A SPRING RETURN FEATURE

FIELD OF THE INVENTION

The invention relates to an actuating drive having a spring return feature, more particularly for valves in heating, ventilating and air-conditioning systems, having: an electric drive; a reduction gearing having a return spring for the spring return feature, the spring being tensionable by the actuating movement; a clutch between the electric drive and the reduction gearing, and a brake device actuated on the spring return movement, the clutch having a member on the drive side and a member on the transmission side, the latter member being releasable from the member on the drive side in the spring return movement.

DESCRIPTION OF THE PRIOR ART

Actuating drives having a spring return feature are often used in practice as regulating drives which in accordance with programmed regulating functions produce actuating movements in both the closing and opening directions of final control elements, for example valves, used to control throughputs. Actuating drives having a spring return feature are also used as on-off drives to operate shutoff valves. In the latter case, the final control element connected to the actuating drive is moved into the open or closed position and retained there electrically. Also, safety rules specify that in the event of malfunction, more particularly in the event of an interruption in the power supply to the electric drive, the final control elements must take up a safety position. The spring return feature is provided for this purpose. The spring energy of the return spring is so transmitted to the final control element that the same performs the required safety function in the event of a failure of the power supply to the electric drive. Constructions are also known wherein the spring return movement is triggered by a current pulse.

The final control element is usually closed by spring force. The clutch which disengages the reduction gearing from the electric drive during the spring return movement is necessary to ensure an operationally reliable and complete return of the final control element. The brake serves to reduce wear of the reduction gearing which might be damaged in the event of an abrupt release of the energy of the return spring.

SUMMARY OF THE INVENTION

It is the object of the invention to disclose a clutch and brake device for an actuating drive which perform the functions hereinbefore described and take up little space.

According to the invention, to solve the problem the brake device is in the form of a centrifugal brake having a stationary brake drum and a rotatably mounted brake shoe carrier on which brake shoes movable radially by centrifugal force are disposed, the brake shoe carrier serves as the clutch member on the transmission side, has a journal with an end pinion engaging in the reduction gearing and the clutch member on the drive side is rotatably mounted on the journal of the brake shoe carrier. The clutch and brake device form a functional unit embodied in a single mechanical assembly.

When the actuating drive is to be used as a regulating drive—i.e., in cases in which it must be possible to execute actuating movements in accordance with predetermined control functions in both directions of rotation—the clutch should be so designed that in its engaged state torques in both directions of rotation can be transmitted from the electric drive to the reduction gearing. In a preferred construction, which can be used as a regulating drive, of the actuating drive according to the invention, the clutch is in the form of a planetary gearing having an outer annulus, planet wheels and a sun wheel, the sun wheel serving as clutch member on the drive side and being rotatably mounted on the brake shoe carrier journal and being drivable by the electric drive, the planet wheels being disposed on the brake shoe carrier and the annulus being locked when the clutch is engaged and freely rotatable when the clutch is disengaged. The term "engaged clutch" denotes the operative state in which power can be transmitted from the electric drive to the reduction gearing. The term "disengaged clutch" denotes the operating state in which the transmission of power from the electric drive to the reduction gearing is interrupted. While the outer annulus remains locked the actuating drive can operate in both directions of rotation as follows: By way of the planet wheels the sun wheel driven by the electric drive drives the brake shoe carrier and the pinion rigidly connected thereto. Movement of the pinion is transmitted by way of the reduction gearing to the final control element, the return spring being tensioned for the spring return movement in dependence upon the actuating travel. Because of the reduction ratio provided by the planetary gearing, the speed of rotation of the brake shoe carrier is so low that the centrifugal brake does not respond to this actuating movement. When the clutch is disengaged the annulus is freely rotatable. As a result of this rotatability the transmission of power between the drive gear and the reduction gearing is therefore interrupted in a manner equivalent to disengagement. The spring return movement is initiated by the disengagement. The spring energy of the return spring is released and the brake shoe carrier is driven by way of the reduction gearing. The centrifugal brake now comes into action. The weight of the brake shoes on the brake shoe carrier is such that at the speeds of rotation occurring the brake shoes produce a programmed braking effect by friction on the brake drum.

There are various possible constructions for locking the outer annulus. A constructionally preferred solution is characterised in that the rotatably mounted annulus has an outer toothed ring and in that at least one catch lever of a locking device engages in the toothed ring and releases the catch lever from the toothed ring to initiate the spring return movement. In another development according to the invention, the locking device has an eccentric drive powered by an electric motor and an electric control circuit arrangement which has at least one capacitor and which by discharge thereof briefly operates the eccentric drive when the power supply to the actuating drive is interrupted. Disengagement of the or each catch lever is produced by a brief operation of the electric motor powered eccentric drive. The response to power interruption is therefore immediate disengagement, which triggers the spring return movement.

As previously described, actuating drives having a spring return feature are also used as on-off drives to operate shutoff valves. According to the invention, an actuating drive construction particularly suitable for this use, is characterised in that a drive gear driven by the electric drive and serving as clutch member on the drive side is rotatably mounted on the journal of the brake shoe carrier and has a drive pin, in that a wrap spring is disposed on the drive pin, the other end of the wrap spring extending tightly around a cylindrical coupling surface on the journal of the brake shoe carrier to provide a non-positive connection between the drive pin and such journal, and in that a locking device is provided and permits rotation of the wrap spring in a direction which tensions the return spring of the reduction gearing and prevents rotation of the wrap spring in the opposite direction. The wrap spring opens during the spring return movement of the reduction gearing so that the non-positive connection between the drive pin and the brake shoe carrier journal is releasable. In this embodiment the clutch transmits torques in only one direction. A disengagement always occurs in the opposite direction of rotation. The spring return movement again triggers the centrifugal brake in the manner hereinbefore described.

According to another constructional aspect of the invention, the wrap spring is secured at its end adjacent the journal to a sleeve which extends around the wrap spring at a distance therefrom and in the form of a jacket and bears rotatably on the drive gear and on the journal. The locking device acts on the sleeve. The invention covers the concept of the journal being devised integrally with a bearing surface for the sleeve and with the cylindrical coupling surface. Preferably, however, a sleeve is secured to the brake shoe carrier journal and has a collar for the mounting of the sleeve and the coupling surface. The locking device can be embodied by disposing a locking spring fixed at one end on the jacket exterior of the sleeve, such locking spring permitting rotation thereof in only one direction. The disengagement operation can finally be further optimised by a short turning back of the drive pin. Preferably, therefore, the electric drive has an electric control circuit arrangement having at least one capacitor which by discharge triggers a brief turning back movement initiating the spring return movement of the electric drive and of the drive gear connected thereto when the power supply to the actuating drive is interrupted.

The invention will be described in detail hereinafter with reference to a drawing showing just one exemplified embodiment in partial and diagrammatic form, wherein:

DETAILED DESCRIPTION OF THE PREFERRED EMBODIMENT

Figure 1:
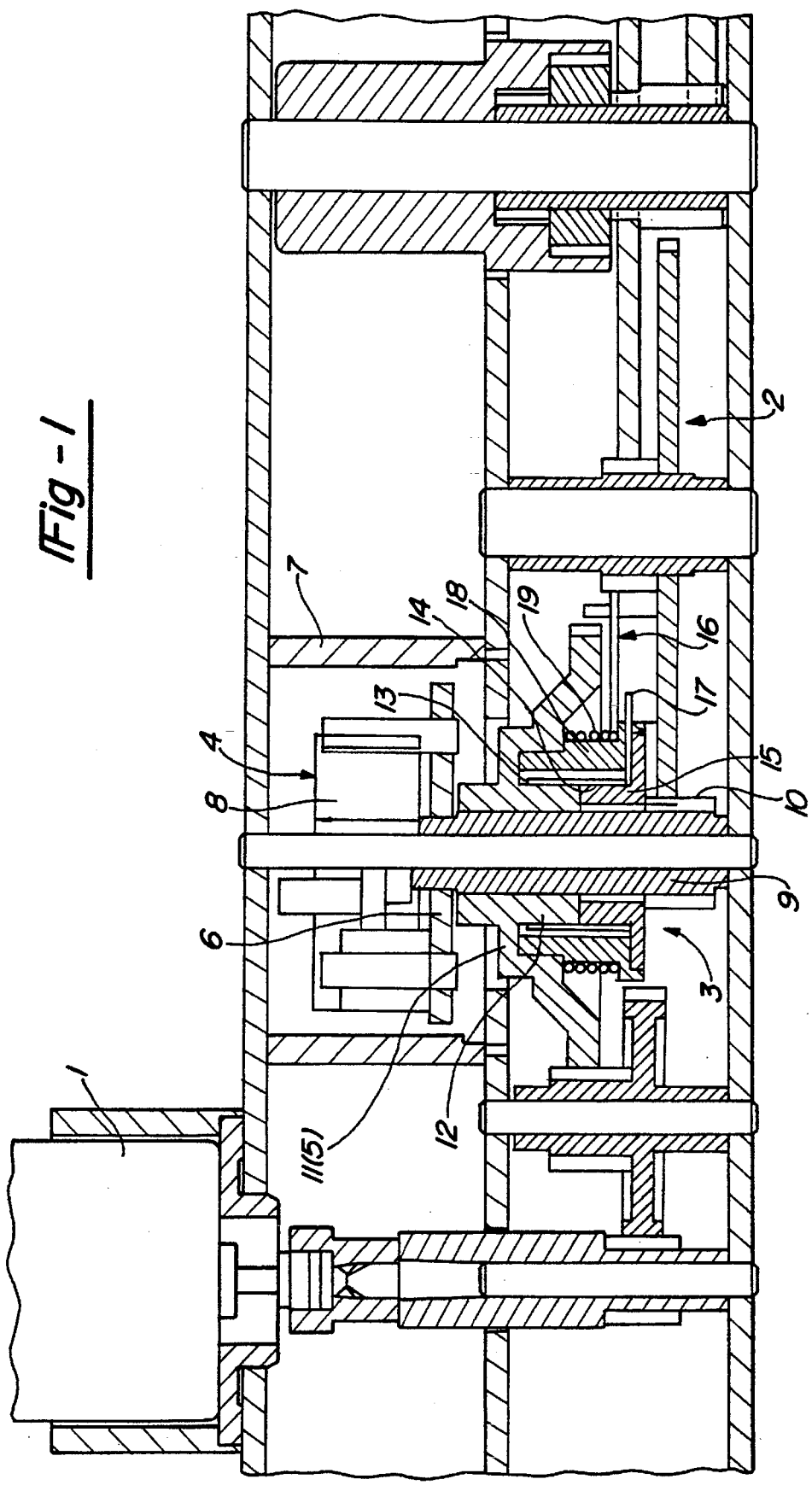
FIG. 1 is a longitudinal section through an actuating drive having a spring return feature in an embodiment suitable for shutoff valves.

The actuating drives illustrated have a spring return feature and comprise an electric drive 1, reduction gearing 2 of a known kind, a clutch 3 between the drive 1 and gearing 2 and a brake device 4 actuated in the spring return movement. Associated with the reduction gearing 2 are a return spring (not shown) for the spring return feature, such spring being tensionable by the actuating movement, and an output shaft (not shown) having provision for the connection of a final control element.

The clutch 3 has a member 5 on the drive side and a member 6 on the gearing side disengageable from the member 5 in the spring return movement. The device 4 is a centrifugal brake comprising a stationary drum 7 and a rotatably mounted brake shoe carrier on which brake shoes 8 movable radially by centrifugal force are disposed. As can further be seen from a comparison of FIGS. 1 and 2, the brake shoe carrier serves as the clutch member 6 on the gearing side and has a journal 9 having an end pinion 10 engaging in the gearing 2. The clutch member 5 on the drive side is rotatably mounted on the brake shoe carrier journal 9. The clutch 3 and brake device 4 form a single functional unit and are embodied as a single mechanical assembly.

In the embodiment of FIG. 1 the clutch member 5 on the drive side takes the form of a drive gear 11 disposed on the journal 9 of the brake shoe carrier 6 and driven by the electric drive 1 and having a drive pin 12. A wrap spring 13 is disposed on the drive pin 12. The wrap spring 13 extends beyond the end of the drive pin 12 and around a cylindrical coupling surface 14 of a sleeve 15 fixedly disposed on the journal 9 of the brake shoe carrier 6. The wrap spring 13 produces a non-positive connection between the drive pin 12 and the journal 9 of the brake shoe carrier 6. Also, a locking device 16 is provided which permits rotation of the wrap spring 13 in a direction to tension the return spring of the reduction gearing, i.e., the winding-up direction, but inhibit rotation of the wrap spring 13 in the opposite direction. The wrap spring 13 opens in the spring return movement to release the non-positive connection between the drive pin 12 and the journal 9 of the brake shoe carrier 6. This is equivalent to an uncoupling of the drive pin 12.

The wrap spring end 17 adjacent the journal is secured to a sleeve 18 which extends like a jacket around the wrap spring 13 with a gap between them and bears rotatably at one end on the drive gear 11 and at the other end on the sleeve 15 fixed on the journal 9. Locking device 16 of the exemplified embodiment consists of a locking spring 19 which is disposed on the jacket side of the sleeve 18 and is fixed at one end. The direction of winding of the spring 19 is such that the sleeve 18 can rotate in the winding-up direction but is prevented from returning.

The actuating drive shown in FIG. 1 and of use more particularly for shutoff valves operates as follows: In response to an actuation of the electric drive 1 the wrap spring 13 couples the drive gear 11, which is in the form of a spur gear, with the brake shoe carrier journal 9. The wrap spring 13 is turned in the winding-up direction by the actuating movement of the drive 1 but is prevented from returning. When the spring energy of the actuating drive return spring tensioned by the adjusting movement is released, the mechanical parts rotate in the direction opposite to the winding-up direction. The locking device 16 locks the sleeve 18 and, through the agency of the spring end engaged on the sleeve 18, the wrap spring 13 opens its turns in the region of the cylindrical coupling surface 14 of the brake shoe carrier 6, corresponding to an uncoupling of the drive pin 12. The centrifugal brake 4 is actuated simultaneously with the spring return movement initiated by the disengagement. The weight of the brake shoes 8 on the carrier 6 is so adapted as to produce at the speeds of rotation occurring a predetermined braking effect controlling the return movement by friction on the brake drum 7.

The disengagement operation can be further optimised by a short turning back of the drive pin 12. To this end, the electric drive 1 preferably has an electrical control circuit arrangement having at least one capacitor; by capacitor discharge the circuit arrangement triggers a brief turning back movement, initiating the spring return movement, of the electric drive 1 and of the drive gear 11 connected thereto when the power supply to the actuating drive is interrupted.

Figure 2:
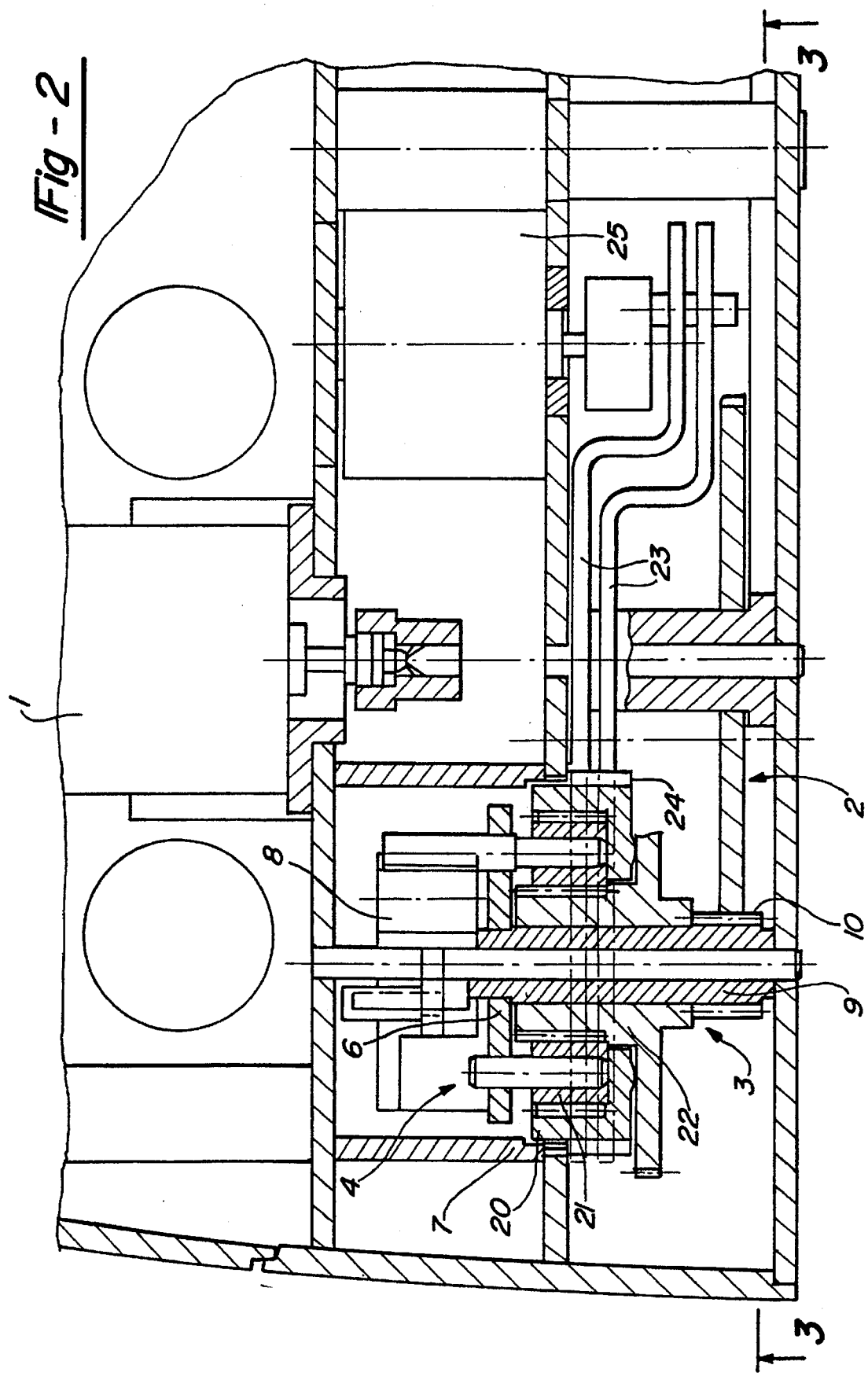
FIG. 2 is a longitudinal section through an actuating drive having a spring return feature in an embodiment suitable more particularly for regulating valves.
Figure 3:
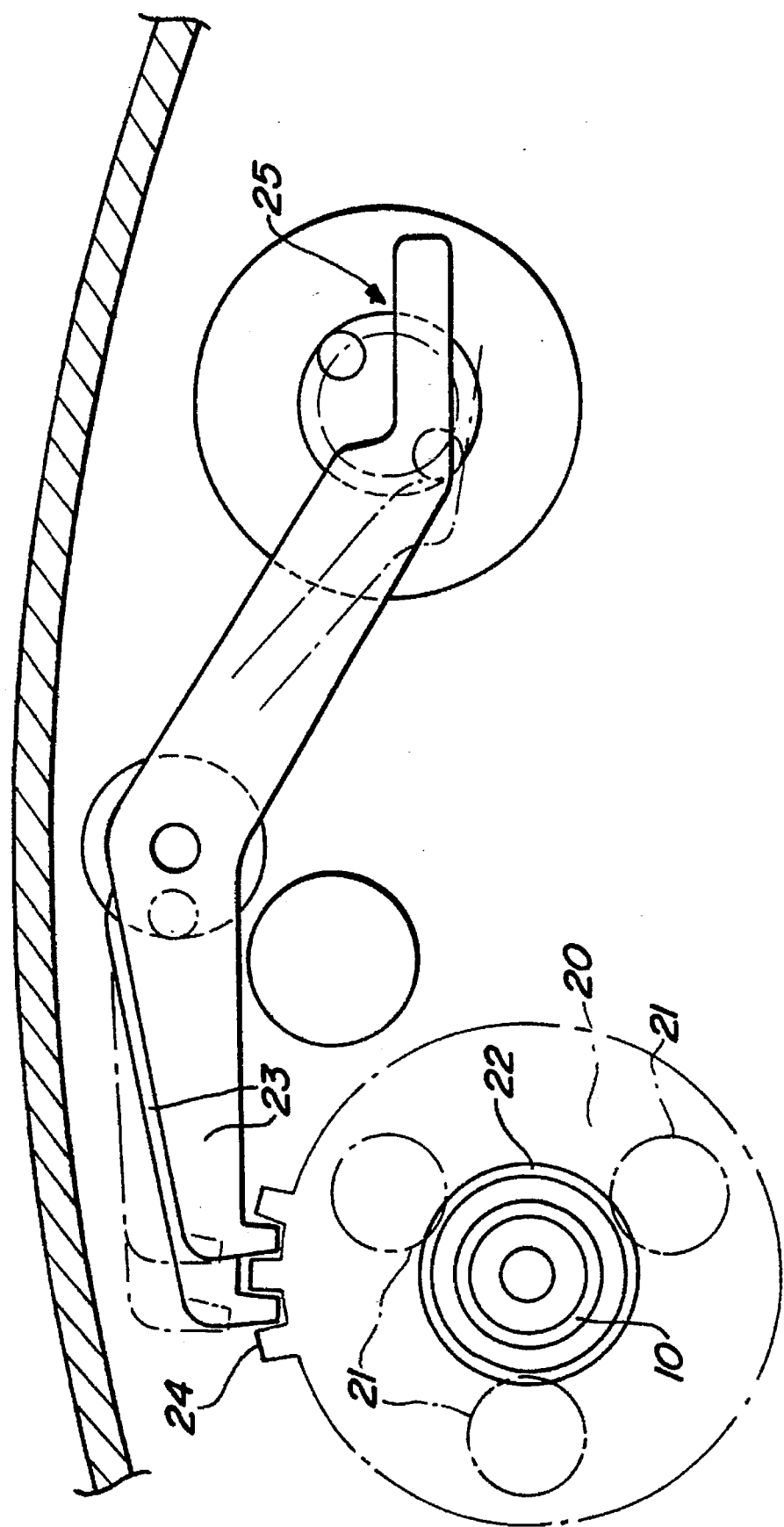
FIG. 3 is a sectional view taken along line A—A of FIG. 2.

The actuating drive shown in FIGS. 2 and 3 is of use for regulating valves for performing actuating movements in both directions of rotation in accordance with programmed actuating functions. In contrast to the construction hereinbefore described, the clutch 3 transmits torques in both directions of rotation. It takes the form of a planetary gearing having an outer annulus 20, planet wheels 21 and a sun wheel 22. The sun wheel 22, as the clutch member on the drive side, is rotatably mounted on the journal 9 of the brake shoe carrier 6 and is drivable by the electric drive 1 by way of pinions (not shown in greater detail in FIG. 2). The planet wheels 21 are disposed on the brake shoe carrier 6. With the clutch engaged the annulus 20 is locked and with the clutch disengaged the annulus 20 is freely rotatable. While the annulus 20 remains locked the actuating drive can operate in both directions of rotation as follows. By way of the planet wheels 21 the sun wheel 22 driven by the electric drive 1 drives the brake shoe carrier 6 and the pinion 10 which is rigidly connected thereto and which engages the reduction gearing (not shown in greater detail in FIG. 2). In the spring return movement the locking of the annulus 20 is released and the same is freely rotatable. The transmission of power between the pinion 10 and the sun wheel 22 is therefore interrupted, something which is equivalent to a disengagement. Also, the centrifugal brake 4 is activated by the spring return movement. The weights of the brake shoes 6 are so adapted as to produce at the speeds of rotation occurring during the spring return movement a predetermined braking effect by friction on the brake drum 7.

A locking device having in the exemplified embodiment two catch levers 23 is provided to lock the rotatably mounted annulus. The catch levers 23 engage in an external toothed ring 24 of the annulus 20 (cf. FIG. 3). Also associated with the locking device are an eccentric drive powered by an electric motor and an electrical circuit arrangement (not shown) having at least one capacitor; by capacitor discharge the control circuit arrangement briefly operates the eccentric drive 25 when the power supply to the actuating drive is interrupted. As FIG. 3 shows, the brief operation of the eccentric drive 25 releases the catch levers 23 from the toothed ring 24. The disengagement initiates the spring return movement.

I claim:

1. An actuating drive having a spring return feature for valves in heating, ventilating and air-conditioning systems, comprising:

an electric drive (1);

a reduction gearing (2) having a return spring for the spring return feature, the spring being tensionable by the actuating movement;

a clutch (3) between the electric drive (1) and the reduction gearing (2), and a brake device (4) actuated on the spring return movement, the clutch (3) having a first member (5) on the drive side and a second member (6) on the transmission side, the second being releasable from the first member (5) on the drive side in the spring return movement, wherein the brake device (4) is in the form of a centrifugal brake having a stationary brake drum (7) and a rotatably mounted brake shoe carrier on which brake shoes (8) movable radially by centrifugal force are disposed, and wherein the brake shoe carrier serves as the clutch member (6) on the transmission side, has a reduction gearing (2) and wherein the clutch member (5) on the drive side is rotatably mounted on the journal (9) of the brake shoe carrier (8).

2. A drive according to claim 1, wherein the clutch (3) is in the form of a planetary gearing having an outer annulus (20), planet wheels (21) and a sun wheel (22), the sun wheel (22) serving as clutch member (5) on the drive side and being rotatably mounted on the journal (9) of the brake shoe carrier (6) and being drivable by the electric drive (1), the planet wheels (21) being disposed on the brake shoe carrier (6) and the annulus (2) being locked when the clutch is engaged and freely rotatable when the clutch is disengaged.

3. A drive according to claim 2, wherein the rotatably mounted annulus (20) has an outer toothed ring (24) and in that at least one catch lever (23) of a locking device engages in the toothed ring, said locking device releasing the catch lever (23) from the toothed ring (24) to initiate the spring return movement.

4. A drive according to claim 3, wherein the locking device has an electric motor powered eccentric drive (25) and an electric control circuit arrangement which has at least one capacitor which by discharge briefly operates the eccentric drive (25) when the power supply to the actuating drive is interrupted.

5. A drive according to claim 1, wherein a drive gear (11) driven by the electric drive (1) and serving as clutch member (5) on the drive side is rotatably mounted on the journal (9) of the brake shoe carrier (6) and has a drive pin (12), in that a wrap spring (13) is disposed on the drive pin (12), the other end of the wrap spring (13) extending tightly around a cylindrical coupling surface (14) on the journal (9) of the brake shoe carrier (6) to provide a non-positive connection between the drive pin (12) and such journal (9), and in that a locking device (16) is provided and permits rotation of the wrap spring (13) in a direction which tensions the return spring of the reduction gearing and prevents rotation of the wrap spring (13) in the opposite direction, the wrap spring (13) opening in the spring return movement of the reduction gearing and thus releasing the non-positive connection between the drive pin (12) and the journal (9) of the brake shoe carrier (6).

6. A drive according to claim 5, wherein the wrap spring (13) is secured at its end (17) adjacent the journal to a sleeve (18) which extends around the wrap spring (13) at a distance therefrom and in the form of a jacket and bears rotatably on the drive gear (11) and on the journal (9), and in that the locking device (16) acts on the sleeve (18).

7. A drive according to claim 6, wherein a sleeve (15) is secured to the journal (9) of the brake shoe carrier (6) and has the collar for the mounting of the sleeve (18) and the coupling surface (14).

8. A drive according to claim 6 wherein a locking spring (19) fixed at one end is disposed on the jacket exterior of the sleeve (18) and permits rotation thereof in only one direction.

9. A drive according to claim 7 wherein a locking spring (19) fixed at one end is disposed on the jacket exterior of the sleeve (18) and permits rotation thereof in only one direction.

* * * * *